Dec. 25, 1928.  
H. S. JANDUS ET AL  
1,696,883  
BUMPER  
Filed Dec. 18, 1926  2 Sheets-Sheet 1
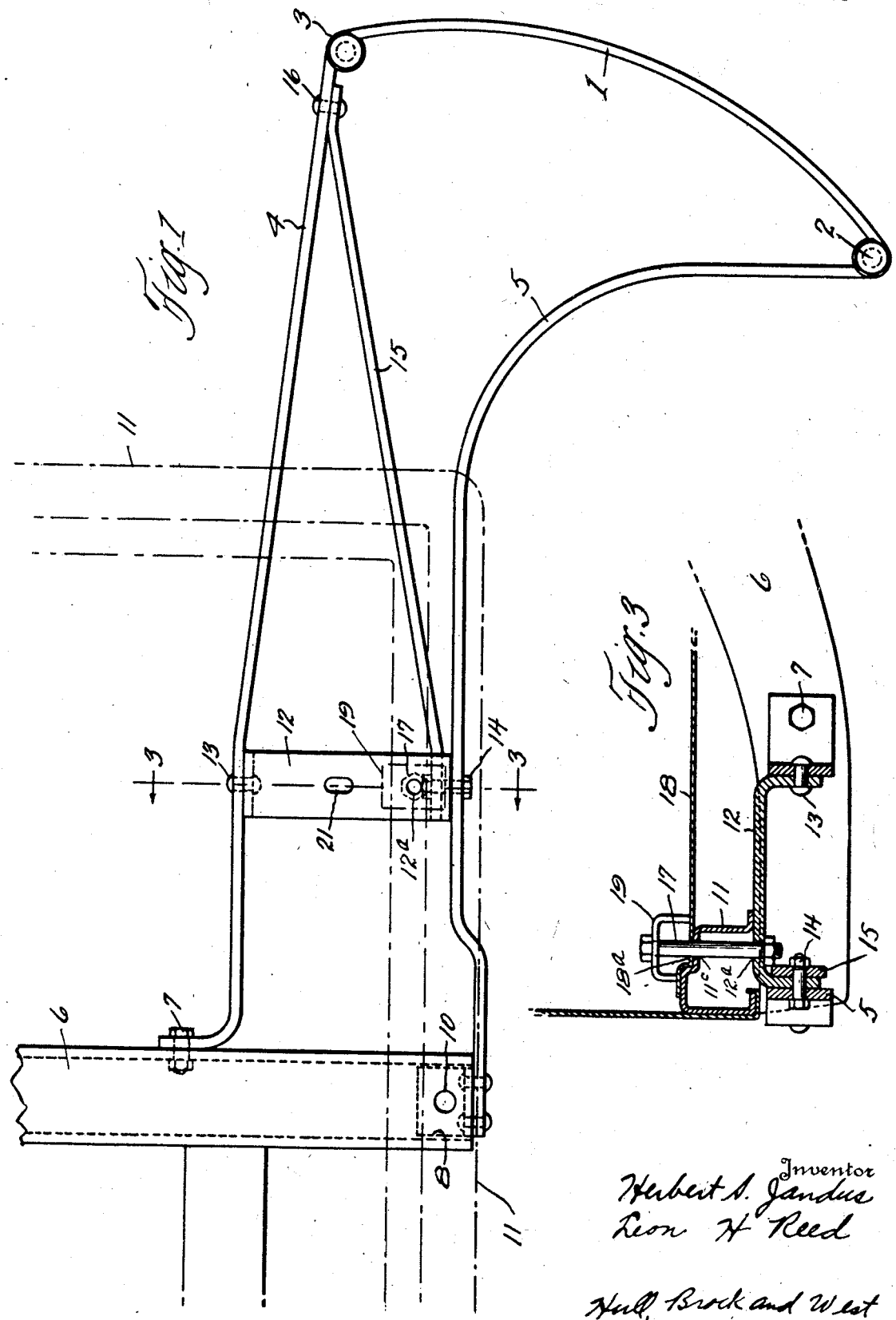
Inventor  
Herbert S. Jandus  
Leon H. Reed  
Hull, Brock and West  
Attorney Dec. 25, 1928.
H. S. JANDUS ET AL
BUMPER
Filed Dec. 18, 1926
1,696,883
2 Sheets-Sheet 2
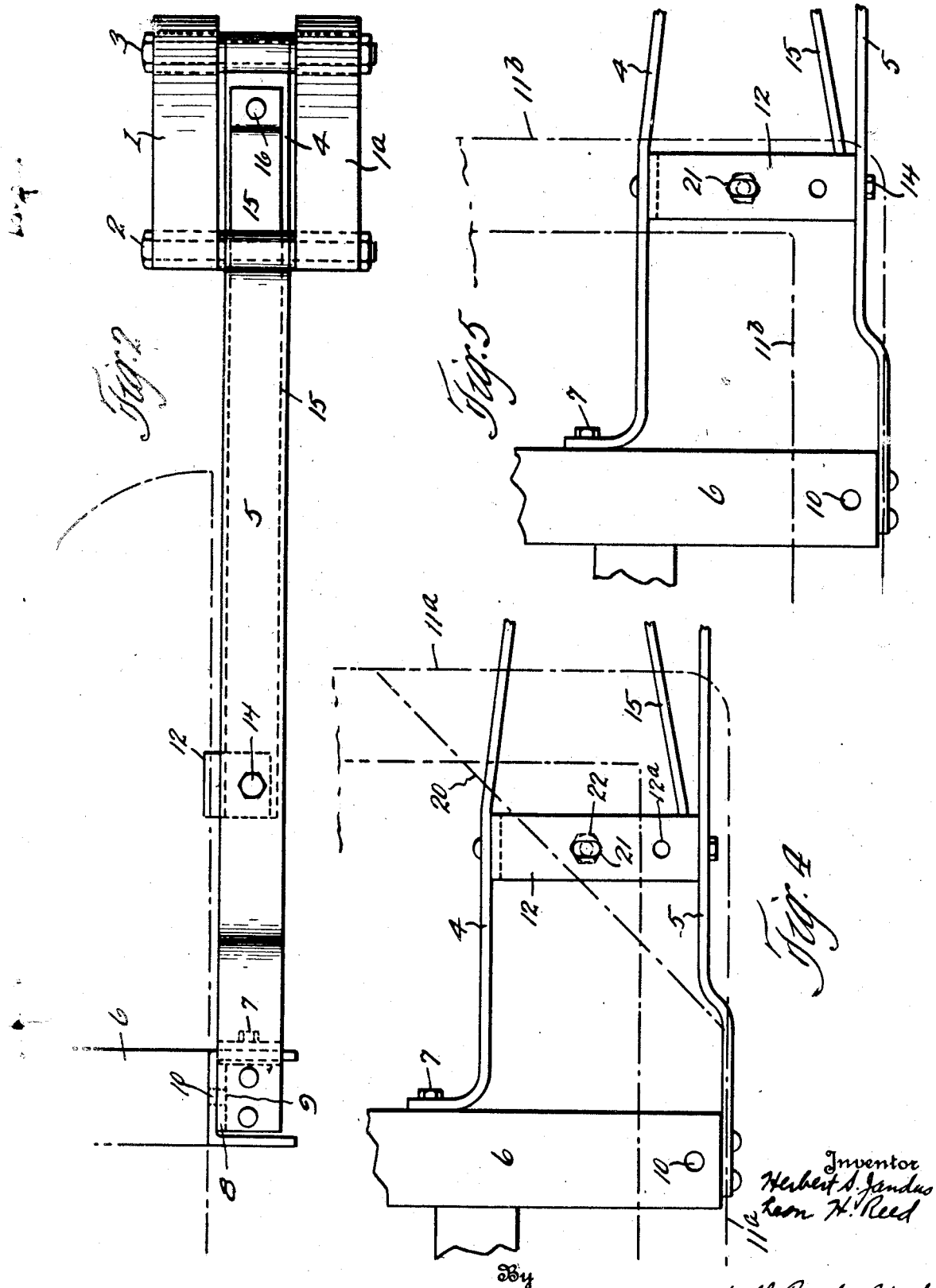

Patented Dec. 25, 1928.

1,696,883

UNITED STATES PATENT OFFICE.

HERBERT S. JANDUS AND LEON H. REED, OF DETROIT, MICHIGAN, ASSIGNORS TO THE C. G. SPRING & BUMPER COMPANY, OF DETROIT, MICHIGAN, A CORPORATION OF DELAWARE.

BUMPER.

Application filed December 18, 1926. Serial No. 155,579.

This invention relates to automobile bumpers and more particularly to bumpers which are adapted to be applied to each side of the rear of an automobile for the protection of the fenders.

It is the general purpose and object of this invention to provide a resilient bumper which may be conveniently attached to the rear of an automobile and which will be supported in such a manner as to eliminate vertical and horizontal vibration. It is a further object of the invention to provide a bumper and support which will be of sufficient strength to afford adequate protection to the automobile in resisting an impact directed toward the fenders.

Further objects of the invention will appear hereinafter and will be realized by the use of the combination of elements set forth in the claims.

In the drawings, Fig. 1 represents a plan view of the bumper as attached to the rear of an automobile; Fig. 2 represents a side elevation of the said bumper; Fig. 3 is a detail in section corresponding to the line 3—3 of Fig. 1; Figs. 4 and 5 show detailed views of modified means for attaching the bumper to the automobile.

For convenience of description the bumper will be assumed to be in position at the rear end of an automobile and the terms "rear" and "front" will be used in reference to such location, though it is not intended that the attachment should be necessarily limited to any particular part of the vehicle.

The invention will be fully described by reference to the following characters on the drawings: 1 denotes the impact element which is here shown as made up of two vertically spaced spring steel bars, 1 and 1ª, connected at their ends by means of pins 2 and 3 passing through eyes at the ends of each bar. The impact element is supported by spring steel bars attached at their forward ends to the automobile frame and having eyes at their rear ends interposed between the upper and lower impact bars 1 and 1ª and in vertical alignment with the eyes at the ends of the said impact bars. The supporting bar 4 is bent at its forward end and is attached to the channel shaped frame cross member 6 by means of a bolt 7 passing through a hole in the bar 4 which registers with a hole in the rear downwardly extending portion of the frame member 6. The support arm 5 is curved outwardly at its rear end for attachment to the outer end of the impact bars. This arm has at its forward end an inwardly projecting bracket 8 fastened to it by rivets or other suitable means, the bracket being of proper width to fit between the two downwardly extending portions of the channel shaped cross member 6. The bracket 8 has a hole 9 which registers with the hole 10 near the end of the cross member 6. The support arms 4 and 5 are connected by means of a channel shaped brace 12 which is shown as riveted to the arm 4 at 13 and attached to the arm 5 by means of the bolt 14.

A brace 15 between the rear end of the arm 4 and the forward end of the arm 5 is shown as riveted to the arm 4 at 16 and connected to the arm 5 by means of the bolt 14 which passes through the brace 12.

In Figs. 1 and 3 the bracket 12 is shown as suspended from the body of the automobile in the following manner: Near the outer edge of the bracket 12 there is a hole 12ª which registers with a hole 11° in the metal body sill 11 and with a hole 18ª in the floor plate 18. A bolt 17 is passed through the holes in the members 11, 12 and 18 and through a channel shaped bearing plate 19. The bearing plate 19 is shown with its outer leg shorter than its inner leg in order to bear equally upon the uneven portions of the floor plate 18. By means of the bolt 17 and the bearing plate 19 the bracket 12 is held rigidly against the lower portions of the sill of the automobile body.

Fig. 4 shows the manner of suspending the bracket 12 from a gusset plate 20 at the rear corner of the body frame. The bracket 12 is shown with an elongated hole 21 and the gusset plate 20 has a hole directly above the hole 21. A bolt 22 is passed through the hole in the gusset plate and the hole 21 and the bumper is held rigidly against the body sill member 11ª by means of said bolt 22.

Fig. 5 shows another modification of the manner of suspending the bumper from the body sill. In this figure the body sill 11ᵇ, which may be of wood, is shown directly above the bracket 12. A lag screw may be passed through the elongated hole 21 and embedded in the wooden body sill 11ᵇ.

When the bumper is attached to the automobile the member 15 will brace the rear end of the bumper and thereby prevent horizontal vibration of the bumper. It will also transmit a part of the load to the front of the bumper support in case a blow is struck against the impact element. The bracket 12 acts both as a brace between the support arms 4 and 5 and as a convenient means for rigidly suspending the bumper from the automobile body.

Our invention is particularly useful when it is necessary to support an impact element at a considerable distance from the frame of the automobile, as is the case in the present type of Ford cars. Our construction affords not only an efficient bumper but also a means for supporting the impact portion at a distance from the car frame, and with freedom from vertical and horizontal vibration.

In the drawings a bumper is shown for protecting only one fender. It is clear that a second bumper may be supported at the opposite side of the automobile for protection of the other rear fender. Identical elements could be used for the bumper on the opposite side, the only difference being in the manner of assembly. The brace 15 is shown as detachably connected to the supporting arm 5 by the bolt 14. This arrangement is convenient for the packing and shipping of the bumper but the connection may be made by any other suitable means.

It is apparent that the bumper impact element may differ from that shown in the drawings. One or more than two impact bars could be substituted for the bars 1 and 1ᵃ. Also the pin-and-eye connection at the ends of the bumper bar could be supplanted by other suitable connections. Furthermore the impact surface might be extended to cover the entire rear of the car and thereby afford protection to the spare tire and the central portion of the car.

Having thus described our invention, what we claim is:

1. The combination with a bumper impact element, of two resilient support arms having their forward ends adapted for attachment to a vehicle frame and their rear ends adapted for attachment at spaced points to the impact element, and a brace attached at its rear end to the rear portion of one support arm and at its front end to the other support arm.

2. The combination with a bumper impact element, of two support arms having their forward ends adapted for attachment to a vehicle frame and their rear ends adapted for attachment at spaced points to the impact element, a brace attached at its rear end to the rear portion of one support arm, and at its front end to the other support arm, and a second brace connecting the forward portions of the support arms.

3. The combination with a bumper impact element, of two support arms having their forward ends adapted for attachment to a vehicle frame and their rear ends adapted for attachment at spaced points to the bumper element, a brace attached at its rear end to the rear portion of one of the support arms and at its front end to the other support arm, a second brace connecting the support arms, and means for attaching said second brace to the vehicle.

4. The combination with a bumper impact element, of two support arms having their forward ends adapted for attachment to a vehicle frame and their rear ends adapted for attachment at spaced points to the bumper impact element, a brace attached at its rear end to the rear portion of one of the support arms and at its front end to the other support arm, a second brace connecting the support arms, and means for attaching said second brace to a vehicle, said means consisting of a bolt and a channel shaped bearing plate having one leg shorter than the other.

5. The combination with a vehicle frame having a lateral frame member, of an impact element, supporting arms connected at their rear ends to the said impact element and at their forward ends to the said lateral frame member, and means for attaching the support arms to a vehicle body at a point spaced rearwardly from the lateral frame member.

6. The combination with a vehicle frame having a lateral frame member, of an impact element, supporting arms connected at their rear ends to the said impact element and at their forward ends to the lateral frame member and means for attaching the support arms to a vehicle body at a point spaced rearwardly from the lateral frame member, said means consisting of a channel shaped brace connecting the support arms, a bearing plate resting upon the floor of the vehicle body and a bolt connecting said brace and bearing plate.

7. The combination with a vehicle frame, of a bumper impact element, resilient support arms connected at their rear ends to said impact element and at their front ends to a vehicle frame, and means for bracing the support arms against lateral movement, said means consisting of a brace attached at its rear end to one of the support arms and at its forward end to the other support arm.

8. The combination with a vehicle frame, of a bumper impact element, support arms connected at their rear ends to said impact element, and at their front ends to a vehicle frame, means for bracing the support arms against lateral movement, and means, consisting of a second brace connecting the support arms and a bolt passing through the said second brace, for connecting the support arms to a vehicle body.

9. The combination, with an impact element comprising bars having eyes at their ends, of a support arm curved outwardly and having an eye at its rear end and adapted at its forward end to fit into and be attached to a channel shaped frame cross member, a second support arm spaced inwardly from said first mentioned support arm having an eye at its rear end and adapted at its forward end to be attached to the frame cross member, pins connecting the eyes at the ends of the impact bars with those at the ends of the support arms, a brace between the rear portion of the inner support arm and the forward portion of the outer support arm, and a lateral brace between the two support arms adapted to suspend the support arms from a vehicle body.

10. The combination, with an impact element comprising bars having eyes at their ends, of a support arm curved outwardly and having an eye at its rear end and adapted at its forward end to fit into and be attached to a channel shaped frame cross member, a second support arm spaced inwardly from said first mentioned support arm, having an eye at its rear end and adapted at its forward end to be attached to the frame cross member, pins connecting the eyes at the ends of the impact bars with those at the ends of the support arms, a brace between the rear portion of the inner support arm and the forward portion of the outer support arm, and a lateral brace between the two support arms adapted to suspend the support arms from a vehicle body, said first mentioned brace being detachably connected to the outer support arm.

11. A bumper including an impact element, two supporting members spaced apart laterally, a diagonal brace connecting the two supporting members, and means connecting the two supporting members for suspending the bumper from a vehicle body.

12. A bumper including an impact element, two resilient supporting members spaced apart laterally, a brace attached at its rear end to one of the supporting elements and at its forward end to the other supporting element, and a lateral brace between the members adapted for connection to a vehicle body.

13. A bumper support consisting of a pair of spaced resilient bars, and a brace attached to points near the inner end of one and the outer end of the other of said bars.

14. A bumper support consisting of a pair of laterally spaced bars each of which has at one end an eye and at the other end means for attaching it to a vehicle frame, a brace connecting the rear portion of one support arm to the forward portion of the other, and means for suspending the bumper support at a point intermediate its ends.

15. A bumper support consisting of a pair of laterally spaced bars each of which has at one end an eye and at the other end means for attaching it to a vehicle frame, a brace connecting the rear portion of one support arm to the forward portion of the other, and means for suspending the bumper support at a point intermediate its ends, said means consisting of a lateral brace connecting the two support arms, a U-shaped bearing plate and a bolt connecting said lateral brace and said bearing plate.

16. A bumper support including a bar having an inwardly projecting member adapted to fit into and be attached to a channel shaped vehicle frame member, a second bar spaced inwardly from the first mentioned bar, and a brace from the outer portion of one of the bars to the inner portion of the other.

17. A bumper support including a bar having an inwardly projecting member adapted to fit into and be attached to a channel shaped vehicle frame member, a second bar spaced inwardly from the first mentioned bar, a brace from the outer portion of one of said bars to the inner portion of the other, and a second brace connecting the bars at a point spaced rearwardly from their forward ends, said second brace being adapted for connection to a vehicle body.

18. The combination, with a vehicle frame, of an impact section, support arms spaced apart at their ends and connected at their inner ends to the vehicle frame and at their outer ends to spaced points on the impact section, means for bracing the support arms against lateral movement, and means for suspending the support arms from the vehicle at a point intermediate their ends, said means including a brace connected at each end portion to one of said support arms.

19. The combination, with a vehicle frame having a frame cross-member, of an impact section, support arms connected at their outer ends to the ends of said impact section and at their inner ends to the said frame cross-member, and means for attaching the support arms to the vehicle at a point spaced rearwardly from the frame cross-member.

20. The combination, with a bumper impact section, of two resilient support arms adapted at their inner end portions to be attached to the vehicle and at their outer end portions to be attached at spaced points to the impact section, and a brace attached at its outer end portion to the outer end portion of one of the support arms and at its inner end portion to the inner end portion of the other support arm.

21. A bumper comprising an impact section, two resilient supporting members spaced apart laterally and a diagonal and a lateral brace connecting said spaced supporting members.

22. A bumper comprising an impact section, two resilient support members spaced apart laterally, a diagonal and a lateral brace connecting said support members, and means for suspending said support members at a point intermediate their ends.

23. A vehicle bumper comprising an impact section connected to a support arm adapted to be attached at its forward portion to a vehicle frame, a second support arm adapted to be connected to the vehicle at its forward end portion and curved outwardly at its rear portion for connection to an end portion of the impact section, and a diagonal brace between the outer end portion of the first mentioned support arm and the inner portion of the second support arm.

24. A vehicle bumper comprising an impact section connected to the outer end portion of a support arm adapted to be supported from the vehicle at its forward end portion, a resilient support bar adapted to be connected to the vehicle at its forward end portion and having its rear end portion curved outwardly for attachment to the outer end portion of the impact section, a lateral brace between the said support arms and a diagonal brace connected at one end portion to the outer end portion of the first mentioned support arm and at its other end portion to the lateral brace at a point spaced from the point of connection of the lateral brace to the first mentioned support arm.

25. A vehicle bumper comprising an impact section pivotally connected at an end portion to a support arm adapted to be connected at its forward end portion to a vehicle, a resilient support arm adapted to be connected at its forward end portion to the vehicle and having its rear portion curved outwardly for connection to the outer end portion of the impact section, and a diagonal brace extending between the outer end portion of said first mentioned support arm and the portion of the second support arm adjacent its point of support from the vehicle.

26. The combination with a vehicle frame having a laterally extending member, of a bumper impact section, support arms connected at their outer end portions to said impact section and at their inner end portions to said vehicle frame and means connecting said support arms between said frame and said impact section for bracing said support arms against lateral movement.

In testimony whereof, we hereunto affix our signatures.

HERBERT S. JANDUS.
LEON H. REED.